(12) United States Patent
Yamada et al.

(10) Patent No.: US 7,960,466 B2
(45) Date of Patent: *Jun. 14, 2011

(54) NATURAL RUBBER MASTERBATCH AND METHOD OF PRODUCING THE SAME

(75) Inventors: Hiroshi Yamada, Tokyo (JP); Kazuhiro Yanagisawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/722,045

(22) PCT Filed: Dec. 19, 2005

(86) PCT No.: PCT/JP2005/023243
§ 371 (c)(1),
(2), (4) Date: Oct. 17, 2007

(87) PCT Pub. No.: WO2006/068078
PCT Pub. Date: Jun. 29, 2006

(65) Prior Publication Data
US 2008/0214700 A1    Sep. 4, 2008

(30) Foreign Application Priority Data
Dec. 20, 2004 (JP) .................. 2004-367956

(51) Int. Cl.
C08J 3/20 (2006.01)
C09B 67/00 (2006.01)
B60C 1/00 (2006.01)

(52) U.S. Cl. ........ 524/495; 524/496; 523/333; 523/351; 423/449.1

(58) Field of Classification Search .......... 524/495–496, 524/571, 425, 432, 437, 447, 575.5; 423/445, 423/450, 449.1, 449.2; 523/333, 351
See application file for complete search history.

(56) References Cited

U.S. PATENT DOCUMENTS

| 5,093,407 A * | 3/1992 | Komai et al. ............ 524/495 |
| 5,100,637 A * | 3/1992 | Nakai .................. 423/445 R |
| 5,124,396 A * | 6/1992 | Branan et al. ............ 524/496 |
| 5,321,072 A * | 6/1994 | Misono ................. 524/496 |
| 5,430,088 A * | 7/1995 | Ohashi et al. ............ 524/496 |
| 2003/0088006 A1* | 5/2003 | Yanagisawa et al. ...... 524/425 |
| 2004/0147669 A1* | 7/2004 | Someno et al. ........... 524/571 |

FOREIGN PATENT DOCUMENTS

| JP | 62-131042 A | 6/1987 |
| JP | 1-275643 A | 11/1989 |
| JP | 01275643 A * | 11/1989 |
| JP | 03-199273 A | 8/1991 |
| JP | 06-228372 A | 8/1994 |
| JP | 6-279624 A | 10/1994 |
| JP | 11-060799 A | 3/1999 |
| JP | 11-291706 A | 10/1999 |
| JP | 2000-219778 A | 8/2000 |
| JP | 2000-344948 A | 12/2000 |
| JP | 2003-041055 A | 2/2003 |
| JP | 2004-99625 A | 4/2004 |

* cited by examiner

Primary Examiner — Vasu Jagannathan
Assistant Examiner — Hannah Pak
(74) Attorney, Agent, or Firm — Sughrue Mion, PLLC

(57) ABSTRACT

The present invention provides a natural rubber masterbatch effective in achieving a tread rubber composition which is suitable for heavy-duty tires for rough roads and which is effective in greatly enhancing the abrasion resistance of the tires without impairing the low heat build-up of the tires, a method of producing the natural rubber masterbatch, a rubber composition prepared using the natural rubber masterbatch, and a tire. In a mixing step of mixing a natural rubber latex with a slurry containing water and a carbon black dispersed therein, 10 to 100 weight parts of the carbon black is mixed with 100 weight parts of a natural rubber component in the natural rubber latex. The carbon black satisfies the following conditions: (1) $N_2SA$ is 120 to 180 $m^2/g$; (2) the relationship between 24M4DBP and $N_2SA$ is represented by the inequality $15 \leq 24M4DBP - 0.375 N_2SA \leq 38$; and (3) the Dst of aggregates of the carbon black is represented by the inequality $Dst \leq 65$ nm and the ratio ($\Delta D50/Dst$) of the $\Delta D50$ of the carbon black aggregates to the Dst thereof is represented by the inequality $\Delta D50/Dst \leq 0.70$.

11 Claims, No Drawings

NATURAL RUBBER MASTERBATCH AND METHOD OF PRODUCING THE SAME

TECHNICAL FIELD

The present invention relates to natural rubber masterbatches and methods for producing the natural rubber masterbatches. The present invention particularly relates to a natural rubber masterbatch effective in achieving a tread rubber composition which is suitable for heavy-duty tires for rough roads and which is effective in greatly enhancing the abrasion resistance of the tires without impairing the low heat build-up of the tires and also relates to a method of producing the natural rubber masterbatch. Furthermore, the present invention relates to a rubber composition prepared using the natural rubber masterbatch and tires and particularly relates to a heavy-duty tire for rough roads.

BACKGROUND ART

Up to now, carbon black has been used as a reinforcing filler for rubbers such as tires. This is because carbon black has higher reinforcing ability and abrasion resistance as compared to other fillers. The microstructurization of carbon black is known to be effective in enhancing the abrasion resistance and tear resistance of heavy-duty tires for rough roads. Carbon black aggregates with narrow size distribution are known to exhibit substantially enhanced reinforcing ability.

On the other hand, a method of producing a readily processable rubber is known to use a wet masterbatch. The method is as follows: a slurry is prepared in such a manner that water is mixed with a filler such as carbon black or silica at a predetermined ratio in advance and the filler is finely dispersed in water with mechanical force; the slurry and a rubber latex are mixed together; the mixture is coagulated by adding a coagulant such as an acid, an inorganic salt, or an amine to the mixture; and the coagulate is recovered and then dried.

The following masterbatches have been recently reported (Patent Documents 1 and 2): natural rubber masterbatches which do not have problems inherent to natural rubber wet masterbatches containing natural rubber, carbon black, silica, another inorganic filler, and the like, that is, problems that the natural rubber wet masterbatches have a less improvement in processability as compared to wet masterbatches containing synthetic rubber and therefore it is difficult to uniformly disperse such fillers but which have high processability, reinforcing ability, and abrasion resistance.

Patent Document 1: Japanese Unexamined Patent Application Publication No. 2003-41055 (Claims and the like)
Patent Document 2: Japanese Unexamined Patent Application Publication No. 2004-99625 (Claims and the like)

DISCLOSURE OF INVENTION

Problems to be Solved by the Invention

In consideration of application to heavy-duty tires and the like for rough roads, the microstructurization of carbon black to be compounded and the narrowing of the distribution of aggregates may be attempted. These attempts cause the deterioration of the dispersion of carbon black in rubber and therefore have a problem that sufficient abrasion resistance cannot be achieved and a problem that high heat build-up is caused. Although the natural rubber masterbatches disclosed in Patent Documents 1 and 2 are effective in improving the processability, reinforcing ability, and abrasion resistance of rubber compositions, the natural rubber masterbatches need to be improved such that the problem on the distribution of carbon black is solved.

It is an object of the present invention to provide a natural rubber masterbatch effective in achieving a tread rubber composition which is suitable for heavy-duty tires for rough roads and which is effective in greatly enhancing the abrasion resistance of the tires without impairing the low heat build-up of the tires and to provide a method of producing the natural rubber masterbatch.

It is another object of the present invention to provide a natural rubber composition prepared using the rubber masterbatch and to provide a tire, particularly a heavy-duty tire, produced using the rubber composition, for rough roads.

Means for Solving the Problems

The inventors have made intensive investigations to solve the above problems and have then found that the above objects can be achieved in such a manner that a method of producing a natural rubber masterbatch is improved and a specific carbon black is used. This has led to the completion of the present invention.

A method of producing natural rubber masterbatch according to the present invention includes a mixing step of mixing a natural rubber latex with a slurry containing water and a carbon black dispersed therein. Ten to 100 weight parts of the carbon black is mixed with 100 weight parts of a natural rubber component in the natural rubber latex. The carbon black satisfies the following conditions:

(1) the nitrogen adsorption specific surface area ($N_2SA$) thereof is 120 to 180 $m^2/g$;
(2) the relationship between 24M4DBP and $N_2SA$ is represented by the inequality $15 \leq 24M4DBP - 0.375 N_2SA \leq 38$; and
(3) the mode (Dst) of aggregates of the carbon black is represented by the inequality $Dst \leq 65$ nm and the ratio ($\Delta D50/Dst$) of the half width ($\Delta D50$) of the carbon black aggregates to the mode (Dst) thereof is represented by the inequality $\Delta D50/Dst \leq 0.70$.

A natural rubber masterbatch is produced by the natural rubber masterbatch-producing method.

The present invention relates to a rubber composition produced using the natural rubber masterbatch and also relates to a tire produced using the rubber composition.

Advantages

A producing method is effective in producing a natural rubber masterbatch suitable for a natural rubber composition having highly balanced properties, such as processability, reinforcing ability, and abrasion resistance. A rubber composition according to the present invention is effective in achieving a tread rubber composition which is suitable for heavy-duty tires for rough roads and which is effective in greatly enhancing the abrasion resistance of the tires without impairing the low heat build-up of the tires.

BEST MODE FOR CARRYING OUT THE INVENTION

Embodiments of the present invention will now be described in detail.

In the present invention, it is necessary to produce a slurry containing water and a specific carbon black, dispersed therein, according to the present invention in advance of a mixing step of mixing the slurry and a natural rubber latex. A method of producing the slurry is not particularly limited and may be a known one. For example, a predetermined amount of the carbon black and water are charged into a homo-mixer and then mixed together for a predetermined time, whereby the slurry can be prepared.

In the production of the slurry, the particle size distribution and 24M4DBP oil absorption of the carbon black in the water-based slurry are preferably adjusted within the ranges specified below.

In the mixing step of mixing the natural rubber latex with the slurry, which contains water and the carbon black dispersed therein, (i) the carbon black in the water-based slurry preferably has particle size distribution in which the volume-average particle size (mv) thereof is 25 μm or less and in which the 90th volume percentile particle size (D90) thereof is 30 μm or less and (ii) the 24M4DBP oil absorption of the carbon black that has been recovered from the water-based slurry by drying is preferably maintained at 93% or more of the 24M4DBP oil absorption of the carbon black that has not yet been dispersed in water. The 24M4DBP oil absorption is a value determined according to ISO 6894.

It is more preferable that the volume-average particle size (mv) thereof be 20 μm or less and that the 90th volume percentile particle size (D90) thereof be 25 μm or less. An excessive increase in particle size may cause the deterioration of the dispersion of the carbon black in rubber, thereby impairing the reinforcing ability and abrasion resistance.

If an excessive shear stress is applied to the slurry such that the particle size thereof is reduced, the structure of the carbon black is destroyed and therefore the reinforcing ability impaired. From this viewpoint, the 24M4DBP oil absorption of the filler that has been recovered from the water-based slurry by drying is preferably maintained at 93% or more of the 24M4DBP oil absorption of the carbon black that has not yet been used to produce the slurry and more preferably 96% or more.

The following apparatus is used to produce the carbon black-water slurry: a rotor stator-type high shear mixer, a high-pressure homogenizer, an ultrasonic homogenizer, a colloid mill, or the like. For example, a predetermined amount of the filler and water are charged into such a colloid mill and then mixed together for a predetermined time at high speed, whereby the slurry can be prepared.

In the present invention, in order to enhance the processability, the reinforcing ability, and the abrasion resistance, the natural rubber latex used preferably has been treated in a cleavage step of cleaving amide bonds in the natural rubber latex. Various processes can be used to cleave the amide bonds in the natural rubber latex. In particular, a process using a protease or an aromatic polycarboxylic acid derivative is preferably used.

In the process using the protease, the protease has the ability to cleave the amide bonds present in a component of a surface layer of the natural rubber latex. Examples of the protease include acidic proteases, neutral proteases, and alkaline proteases. In the present invention, an alkaline protease is preferably used because of its effect.

When the amide bonds are cleaved with the protease, conditions suitable for an enzyme used may be used. In the case where Alkalase 2.5 L Type DX produced by Novozymes is mixed with the natural rubber latex, the natural rubber latex is preferably treated at a temperature of 20° C. to 80° C. The pH in this operation is usually 6.0 to 12.0. The amount of the protease used is usually 0.01 to two weight percent and more preferably 0.02 to one weight percent of the amount of the natural rubber latex.

In the process using the aromatic polycarboxylic acid derivative, the aromatic polycarboxylic acid derivative is defined as a compound represented by Formula (I) below.

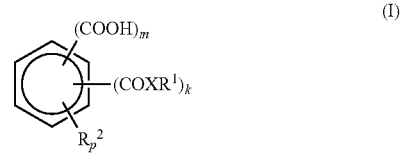

In Formula (I), m and k each represent an integer of one to three; p represents an integer of one to four; the sum of m, k, and p is equal to six; and one, some, or all of carboxyl groups may be dehydrated when m is two or more. X represents oxygen, $NR^3$ ($R^3$ represents hydrogen or an alkyl group with one to 24 carbon atoms), or $-O(R^4O)q$ ($R^4$ represents an alkylene group with one to four carbon atoms and q represents an integer of one to five). $R^1$ represents an alkyl group with one to 24 carbon atoms, an alkenyl group with two to 24 carbon atoms, or an aryl group with six to 24 carbon atoms; $R^2$ represents hydrogen, —OH, an alkyl group, an alkenyl group, or an aryl group; and one, some, or all of hydrogen atoms of $R^1$ and $R^2$ may be substituted by halogen atoms.

In the present invention, the aromatic polycarboxylic acid derivative represented by Formula (I) is preferably a derivative of phthalic acid, trimellitic acid, pyromellitic acid, or an anhydrite thereof. Examples of the aromatic polycarboxylic acid derivative include monostearyl phthalate, monodecyl phthalate, monooctyl phthalic amide, polyoxyethylene lauryl phthalate, monodecyl trimellitate, monostearyl trimellitate, monostearyl pyromellitate, distearyl pyromellitate and the like. Conditions for mixing the aromatic polycarboxylic acid derivative with the natural rubber latex may be appropriately determined depending on the type of the natural rubber latex or the aromatic polycarboxylic acid.

The amount of the aromatic polycarboxylic acid derivative added is preferably 0.01 to 30 weight percent of that of the natural rubber latex. When the amount thereof is less than 0.01 weight percent, the Mooney viscosity thereof cannot be sufficiently low. In contrast, when the amount thereof exceeds 30.0 weight percent, an advantage appropriate to an increment cannot be achieved or fracture properties of vulcanized rubber may be impaired. The amount thereof may be varied within the above range depending on the type and/or grade of the natural rubber latex used and is preferably 0.05 to 20 weight percent in view of costs and properties.

In the cleavage step of cleaving the amide bonds in the natural rubber latex, a surfactant is preferably used to enhance the stability of the latex. The surfactant may be anionic, cationic, nonionic, or amphoteric and is preferably anionic or cationic in particular. The amount of the surfactant used may be appropriately adjusted depending on properties of the natural rubber latex and is usually 0.01 to two weight percent and preferably 0.02 to one weight percent of the amount of the natural rubber latex.

The carbon black used herein needs to satisfy the following conditions:
(1) the nitrogen adsorption specific surface area ($N_2SA$) thereof is 120 to 180 m²/g and preferably 120 to 170 m²/g;
(2) the relationship between 24M4DBP and $N_2SA$ is represented by the inequality $15 \leq 24M4DBP - 0.375N_2SA \leq 38$ and preferably represented by the inequality $27 \leq 24M4DBP - 0.375N_2SA \leq 38$; and (3) the mode (Dst) of aggregates of the carbon black is represented by the inequality Dst≦65 nm and the ratio (ΔD50/Dst) of the half width (ΔD50) of the carbon black aggregates to the mode (Dst) thereof is represented by the inequality ΔD50/Dst≦0.70.

In above Item (1), when the nitrogen adsorption specific surface area ($N_2SA$) is less than 120 $m^2/g$, a rubber composition can have insufficient abrasion resistance. In contrast, even if the nitrogen adsorption specific surface area ($N_2SA$) exceeds 180 $m^2/g$, the dispersion of the carbon black in the rubber composition is nonuniform and therefore the rubber composition can have insufficient abrasion resistance.

The $N_2SA$ of the carbon black is a value determined according to ASTM D4820-93.

In above Item (2), when the value of the expression 24M4DBP−0.375$N_2SA$ is greater than 38, the carbon black has a large structure and therefore the tear resistance is insufficient. In contrast, when the value thereof is less than 15, the structure does not develop enough and therefore the abrasion resistance is insufficient. The 24M4DBP oil absorption is a value determined after the carbon black is repeatedly compressed at a pressure of 24,000 psi four times, that is, a value determined according to ISO 6894.

In above Item (3), when the carbon black aggregates have a mode (Dst) greater than 65 nm, the abrasion resistance is insufficient. When the ratio (ΔD50/Dst) exceeds 0.70, a sufficient improvement in abrasion resistance cannot be achieved.

The term "aggregates" used herein means secondary particles used for analyzing the carbon black by centrifugal sedimentation. The term "mode (Dst)" used herein means one of properties of the carbon black aggregates or the modal size in the Stokes equivalent size distribution curve, that is, the maximum frequency size (Dst). The term "half width (ΔD50)" used herein means the half width (ΔD50) of a distribution curve corresponding to the maximum frequency size (Dst).

These properties can be determined using Disc Centrifuge Photosedimentmeter (DCP: BI-DCP, manufactured by Brook Haven) as described below. To an aqueous solution containing 20 volume percent of ethanol and a slight amount of a surfactant, 50 mg/l of the carbon black is added. The carbon black is completely dispersed in the aqueous solution by ultrasonic treatment. On a rotary disk, 10 ml of distilled water and 1 ml of a buffer solution (a 20% aqueous solution of ethanol) are poured in that order so as to form a sedimentation solution (a spin solution). The rotary disk is rotated at 8000 rpm. On the rotary disk, 0.5 ml of the carbon black dispersion is poured using a syringe such that centrifugal sedimentation is started. The distribution curve of the aggregates can be prepared by photoelectric sedimentation.

Thus, the "mode (Dst)" can be regarded as the mean average size of the carbon black aggregates when a Stokes equivalent size corresponding to the maximum frequency (actually, the maximum absorbance determined by optical analysis) in the Stokes equivalent size distribution curve of the aggregates obtained by the above procedure is defined as a modal size (Dst). The "half width (ΔD50)" is as follows: the absolute value of the difference between two different Stokes equivalent sizes for obtaining the 50% frequency of the modal size (Dst) is regarded as the half width (ΔD50) (nm) of the aggregates. That is, the difference between two different sizes corresponding to half of the modal size (Dst) is regarded as (ΔD50) (nm).

In the natural rubber masterbatch according to the present invention, the concentration of the filler including the carbon black in the slurry is preferably 0.5 to 60 weight percent and more preferably one to 30 weight percent. The amount of the carbon black is preferably ten to 100 weight parts and more preferably 25 to 80 weight parts with respect to 100 weight parts of a rubber component in the natural rubber masterbatch. When the amount of the carbon black is less than ten weight parts, sufficient reinforcing ability cannot be achieved. In contrast, when the amount of the carbon black exceeds 100 weight parts, processability may be insufficient.

Examples of a technique for mixing the slurry and the natural rubber latex together include a technique in which the slurry is charged into, for example, a homo-mixer and the latex is then added dropwise to the slurry while stirring the slurry and a technique in which the slurry is added dropwise to the latex while stirring the latex. Alternatively, the following technique may be used: a technique in which the slurry and the latex are allowed to flow at a predetermined rate and the slurry flow and the latex flow are mixed together by severe hydraulic agitation.

After the above mixing is finished, the natural rubber masterbatch is coagulated with a coagulant such as an acid including formic acid and sulfuric acid or a salt including sodium chloride. Alternatively, in the present invention, the natural rubber masterbatch may be coagulated by mixing the slurry and the latex together without using such a coagulant.

The masterbatch may further contain various additives such as another filler including silica or an inorganic filler, a surfactant, a vulcanizing agent, an anti-aging agent, a colorant, and a dispersant as required in addition to the carbon black.

The masterbatch is usually dried in the final step. In the present invention, the following drier can be used: an ordinary drier such as a vacuum drier, an air drier, a drum drier, or a hand drier. In order to enhance the dispersion of the carbon black, the masterbatch is preferably dried while applying a mechanical shear stress thereto. This provides rubber which has excellent processability and reinforcing ability and which is effective in reducing fuel consumption. An ordinary kneader may be used to dry the masterbatch. In view of industrial productivity, a continuous kneader is preferably used. Alternatively, a kneading extruder including multiple co-rotating or counter-rotating screws is more preferably used.

In the step of drying the masterbatch with a shear stress applied thereto, the content of water in the undried masterbatch is preferably 10% or more. When the water content is less than 10%, the drying step may result in a slight improvement in the dispersion of the filler.

As described above, the natural rubber masterbatch is produced in such a manner that the natural rubber latex is mixed with the slurry prepared by dispersing the carbon black in water and the mixture is coagulated.

A rubber composition according to the present invention is produced using the natural rubber masterbatch. The rubber composition may contain various agents, such as a vulcanizing agent, a vulcanizing accelerator, an anti-aging agent, a scorch retarder, zinc oxide, and stearic acid, usually used in the rubber industry, provided that the object of the present invention is not impaired.

A tire according to the present invention is produced in such a manner that the rubber composition is used to form a tread thereof. The rubber composition can impart significant advantages to heavy-duty tires for rough roads.

EXAMPLES

The present invention will now be further described with reference to examples.

Various tests were performed in examples and comparative examples as described below.

(1) Abrasion Resistance Test

Various tires with a size of 1000R20 14PR were prepared in such a manner that sample rubber compositions were used to form tire treads. After each tire was caused to run on a rough road for 6000 km, the abrasion resistance index of the tire was determined from the following equation on the basis of the travel distance of the tire per 1 millimeter of abrasion loss:

Abrasion resistance index=(travel distance of each tested tire/abrasion loss of each tested tire)/(travel distance of tire of Comparative Example 3/abrasion loss of tire of Comparative Example 3)

The larger the index, the better the abrasion resistance.

(2) Heat Build-Up Test

Tan δ was determined with a spectrometer (a dynamic strain amplitude of 1%, a frequency of 52 Hz, and a measurement temperature of 25° C.) manufactured by TOYOSEIKI. The heat build-up index was calculated from the following equation: Heat build-up index=(tan δ of each sample strip)/(tan δ of sample strip of Comparative Example 3).

The smaller the index, the smaller the heat build-up.

(Step of Preparing Latex)

A natural rubber field latex (a rubber content of 24.2%) was diluted to a rubber content of 20% with deionized water. To the diluted natural rubber field latex, 0.5% of an anionic surfactant (Demol N produced by Kao Corporation) and 0.1% of an alkaline protease (Alkalase 2.5 L Type DX produced by Novozymes) were added. The mixture was stirred at 40° C. for eight hours, whereby amide bonds in the natural rubber field latex were cleaved.

(Step of Preparing Carbon Black-Water Slurry)

Into a colloid mill with a rotor diameter of 50 mm, 1425 g of deionized water and 75 g of one of various carbon blacks shown in Table 1 were charged. The mixture was stirred for ten minutes at a rotor-stator gap of 1 mm and a rotation speed of 1500 rpm.

(Coagulation Step)

The latex and each slurry prepared as described above were charged into a homo-mixer such that 45 weight parts of the carbon black was mixed with 100 weight parts of a rubber component therein. While stirring each mixture, formic acid was added to the mixture until the mixture reached pH 4.5. A coagulated masterbatch was recovered from the mixture, cleaned with water, and dehydrated until the water content thereof was reduced to about 40%.

(Drying Step)

The masterbatch was dried at a barrel temperature of 120° C. and a rotation speed of 100 rpm by a twin-screw kneading extruder process using a twin-screw kneading extruder (co-rotating screws with a diameter of 30 mm, L/D=35, and three vent holes) manufactured by Kobe Steel. The amount of the carbon black in the obtained masterbatch was 45 weight parts with respect to 100 weight parts of the natural rubber, respectively.

In Comparative Examples 1 and 2 shown in Table 1, the following compositions were used instead of the master batch: rubber compositions, so-called dry blends, prepared by mixing 100 weight parts of natural rubber and 45 weight parts of carbon blacks shown in Table 1 together in an internal mixer.

(Step of Preparing Rubber Composition)

Each carbon black-compounded rubber (100 weight parts of natural rubber and 45 weight parts of one of the carbon blacks) prepared using one of the masterbatches or the dry blends was compounded with three weight parts of zinc oxide (Grade 1, produced by Hakusui Chemical), 1.5 weight parts of sulfur (produced by Karuizawa Seirensho), two weight parts of stearic acid (produced by NOF Corporation), one weight part of a vulcanization accelerator (N-cyclohexyl-2-benzothiazylsulfenamide, NOCCELER CZ, produced by Ouchishinko Chemical Industrial Co., Ltd.), and one weight part of an anti-aging agent (N-(1,3-dimethylbutyl)-N'-phenyl-p-phenylenediamine, NOCRAC 6C, produced by Ouchishinko Chemical Industrial Co., Ltd.). The mixture was kneaded in an internal mixer, whereby a rubber composition was prepared. The resulting rubber composition was evaluated for abrasion resistance and heat build-up. The results are shown in Table 1.

TABLE 1

| Mixing type | | Comparative Example 1 | Comparative Example 2 | Comparative Example 3 | Comparative Example 4 | Example 1 | Example 2 | Example 3 |
|---|---|---|---|---|---|---|---|---|
| | | Dry blends | | Natural rubber masterbatches | | | | |
| Carbon black[1] | | A | C | A | B | C | D | E |
| $N_2SA$ (m$^2$/g) | | 120 | 128 | 120 | 145 | 128 | 158 | 149 |
| 24M4DBP (ml/100 g) | | 100 | 82 | 100 | 102 | 82 | 94 | 80 |
| Dst (nm) | | 67 | 60 | 67 | 56 | 60 | 54 | 48 |
| D50 (nm) | | 47 | 41 | 47 | 51 | 41 | 38 | 33 |
| D50/Dst | | 0.70 | 0.68 | 0.70 | 0.91 | 0.68 | 0.70 | 0.69 |
| 24M4DBP − 0.375 × $N_2SA$ | | 55 | 34 | 55 | 48 | 34 | 35 | 24 |
| Carbon black in slurry | mv (μm) | — | — | 8.3 | 9.4 | 9.0 | 10.1 | 9.3 |
| | D90 (μm) | — | — | 12.5 | 14.4 | 14.3 | 16.2 | 14.8 |
| Recovered carbon black | 24M4DBP (ml/100 g) | — | — | 97 | 99 | 80 | 91 | 78 |
| | Retention (%) | — | — | 97.0 | 97.1 | 97.7 | 96.8 | 97.5 |
| Abrasion resistance (index) | | 94 | 103 | 100 | 108 | 114 | 122 | 121 |
| Heat build-up (index) | | 106 | 111 | 100 | 107 | 97 | 105 | 101 |

[1]Carbon Black A: N234
Carbon Black B: N134
Carbon Blacks C to E: (Production conditions are shown in Table 2 below.)

TABLE 2

|  | Carbon species | | |
|---|---|---|---|
|  | C | D | E |
| Feed rate of air for production (kg/h) | 1380 | 1450 | 1420 |
| Preheating temperature of air (° C.) | 662 | 670 | 665 |
| Feed rate of fuel (kg/h) | 83 | 86 | 85 |
| Surplus of air in combustion gas (%) | 17.3 | 18.9 | 17.8 |
| Feed rate of source oil (kg/h) | 285 | 252 | 259 |
| Atomizing pressure of source oil (MPa) | 2.2 | 2.3 | 2.2 |
| Preheating temperature of source oil (° C.) | 210 | 215 | 195 |
| Amount of potassium (with respect to the amount of source oil) (ppm) | 43 | 15 | 45 |

As is clear from Table 1, the rubber compositions of Examples 1 to 3 meet all requirements specified herein are more improved in distribution and structure as compared to the rubber compositions of Comparative Examples 1 to 4. Hence, the rubber compositions of Examples 1 to 3 have significantly improved abrasion resistance, that is, they have both high abrasion resistance and low heat build-up.

The invention claimed is:

1. A method of producing natural rubber masterbatch, comprising a mixing step of mixing a natural rubber latex with a slurry containing water and a carbon black dispersed therein, wherein 10 to 100 weight parts of the carbon black is mixed with 100 weight parts of a natural rubber component in the natural rubber latex and the carbon black satisfies the following conditions:
   (1) the nitrogen adsorption specific surface area ($N_2SA$) thereof is 120 to 149 $m^2/g$;
   (2) the relationship between 24M4DBP oil absorption and $N_2SA$ is represented by the inequality $15 \leq 24M4DBP - 0.375N_2SA \leq 38$; and
   (3) the mode (Dst) of aggregates of the carbon black is represented by the inequality $Dst \leq 65$ nm and the ratio ($\Delta D50/Dst$) of the half width ($\Delta D50$) of the carbon black aggregates to the mode (Dst) thereof is represented by the inequality $\Delta D50/Dst \leq 0.70$.

2. The natural rubber masterbatch-producing method according to claim 1, wherein in the mixing step, (i) the carbon black in the water-based slurry has particle size distribution in which the volume-average particle size (mv) thereof is 25 μm or less and in which the 90th volume percentile particle size (D90) thereof is 30 μm or less and (ii) the 24M4DBP oil absorption of the carbon black that has been recovered from the water-based slurry by drying is maintained at 93% or more of the 24M4DBP oil absorption of the carbon black that has not yet been dispersed in water.

3. The natural rubber masterbatch-producing method according to claim 1, wherein the natural rubber latex has been treated in a cleavage step of cleaving amide bonds in the natural rubber latex.

4. The natural rubber masterbatch-producing method according to claim 3, wherein the cleavage step uses a protease and/or an aromatic polycarboxylic acid derivative.

5. The natural rubber masterbatch-producing method according to claim 4, wherein the protease is alkaline.

6. The natural rubber masterbatch-producing method according to claim 1, wherein the natural rubber latex and/or the slurry contains a surfactant.

7. The natural rubber masterbatch-producing method according to claim 1, wherein the natural rubber masterbatch prepared in the mixing step is coagulated and then dried in a drying step while applying a mechanical shear stress thereto.

8. The natural rubber masterbatch-producing method according to claim 7, wherein the drying step uses a continuous kneader for drying.

9. The natural rubber masterbatch-producing method according to claim 8, wherein the continuous kneader is a multi-screw kneading extruder.

10. A natural rubber masterbatch produced by the natural rubber masterbatch-producing method according to claim 1.

11. A tire produced using the natural rubber masterbatch according to claim 10.

* * * * *